(12) United States Patent
Yamasaki et al.

(10) Patent No.: US 10,685,490 B2
(45) Date of Patent: Jun. 16, 2020

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Masayoshi Yamasaki, Kawasaki (JP); Koji Makita, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 15 days.

(21) Appl. No.: 15/455,291

(22) Filed: Mar. 10, 2017

(65) Prior Publication Data

US 2017/0263054 A1  Sep. 14, 2017

(30) Foreign Application Priority Data

Mar. 10, 2016 (JP) .................. 2016-047233
Jan. 6, 2017 (JP) .................. 2017-001010

(51) Int. Cl.
*G06T 19/00* (2011.01)
*G06T 7/90* (2017.01)
*G06T 7/73* (2017.01)

(52) U.S. Cl.
CPC .............. *G06T 19/006* (2013.01); *G06T 7/73* (2017.01); *G06T 7/90* (2017.01)

(58) Field of Classification Search
CPC ........... G06T 19/006; G06T 7/73; G06T 7/90
USPC ............................................... 345/629–635
See application file for complete search history.

(56) References Cited

U.S. PATENT DOCUMENTS

| 9,396,509 | B1* | 7/2016 | Reed .................. G06T 1/0021 |
| 9,557,167 | B2 | 1/2017 | Kobayashi et al. |
| 2005/0035980 | A1* | 2/2005 | Lonsing ................ G06T 15/00 345/633 |
| 2010/0142826 | A1* | 6/2010 | Kotake .................... G06T 7/75 382/203 |
| 2011/0304646 | A1* | 12/2011 | Kato ..................... G09G 5/377 345/632 |
| 2012/0086729 | A1* | 4/2012 | Baseley ................ G06F 3/011 345/633 |
| 2012/0275755 | A1* | 11/2012 | Southworth .......... G06T 19/006 386/200 |
| 2013/0265330 | A1* | 10/2013 | Goto ..................... G06T 19/006 345/632 |
| 2015/0170393 | A1* | 6/2015 | Tada ....................... G06T 11/60 345/633 |

(Continued)

OTHER PUBLICATIONS

Tenmoku, R., et al., "Balancing Design Freedom and Constraints in Wall Posters Masquerading as AR Tracking Markers," VMR '09 Proceedings of the 3rd International Conference on Virtual and Mixed Reality, Proc. Human-Computer Interaction International, Jul. 2009, pp. 263-272.

(Continued)

*Primary Examiner* — Chante E Harrison
(74) *Attorney, Agent, or Firm* — Carter, DeLuca & Farrell LLP (57) ABSTRACT

An information processing apparatus determines luminance of a pattern given as an index to an experience area of a real space, based on a threshold in case of detecting a feature of an image, and generates an image of the pattern of the determined luminance.

11 Claims, 7 Drawing Sheets

(56) References Cited

U.S. PATENT DOCUMENTS

| | | | |
|---|---|---|---|
| 2015/0178992 A1* | 6/2015 | Bhuruth | G06T 19/006 |
| | | | 345/633 |
| 2015/0228123 A1* | 8/2015 | Yasutake | G06T 19/006 |
| | | | 345/633 |
| 2015/0243016 A1* | 8/2015 | Moteki | G06T 7/70 |
| | | | 382/103 |
| 2015/0310617 A1* | 10/2015 | Hara | H04N 5/23229 |
| | | | 345/633 |
| 2015/0310663 A1 | 10/2015 | Yamasaki et al. | |
| 2015/0362312 A1 | 12/2015 | Higo et al. | |
| 2016/0147492 A1* | 5/2016 | Fugate | G06F 3/1423 |
| | | | 345/633 |
| 2016/0156899 A1 | 6/2016 | Higo et al. | |
| 2018/0158212 A1* | 6/2018 | Ghazizadeh | A61B 5/445 |

OTHER PUBLICATIONS

Lowe, D., "Distinctive Image Features From Scale-Invariant Keypoints," International Journal of Computer Vision (IJCV), Nov. 2004, pp. 1-28.

Bay, H., et. al., "SURF: Speeded Up Robust Features," European Conference on Computer Vision (ECCV), May 2006, pp. 1-14.

\* cited by examiner

INFORMATION PROCESSING APPARATUS, INFORMATION PROCESSING METHOD, AND STORAGE MEDIUM

BACKGROUND OF THE INVENTION

Field of the Invention

The present invention relates to an information processing apparatus, an information processing method, a program and an information processing system which provide mixed reality and augmented reality.

Description of the Related Art

A mixed reality (hereinafter referred to as MR) technique and an augmented reality (hereinafter referred to as AR) technique are known as techniques for fusing a real world and a virtual world together in real time. The relevant techniques aim at seamlessly fusing together a real space and a virtual space created by a computer.

A video see-through information processing apparatus is available as one of apparatuses for providing MR to a user. The video see-through information processing apparatus displays a composite image in which a virtual object is superimposed on an image acquired by photographing a real world with a video camera, on a displaying device such as a display or the like in real time, so as to present the composite image to the user. As an example of the apparatus like this, a video see-through head-mounted display (hereinafter referred to as an HMD) or the like is known. The video see-through HMD used for the MR measures, each time an image is input from a built-in camera, the position and orientation of the camera in the real space at the time of photographing the image. Then, the HMD draws a computer graphic (hereinafter referred to as CG) based on the measured position and orientation of the camera, and camera intrinsic parameters such as a focal length and the like, and then superimposes an acquired CG image on the image acquired by photographing the real space.

Here, a positioning (aligning) function is an important function for realizing the MR. In order for the user to feel that a virtual object actually exists in the real space, it is necessary to achieve geometric consistency between the virtual object and the real space. That is, from the viewpoint of the user who is experiencing the MR, the virtual object must appear to exist at the position which should exist in the real space. Therefore, the HMD is designed to acquire the position and orientation in the real space of the built-in camera and achieve the geometrical consistency between the virtual object and the real space.

The position and orientation of the camera can be estimated based on the image information transferred from the camera built in the HMD. For example, there has been known a method of photographing, by the camera, an index having its known three-dimensional position in the real space, and then estimating the position and orientation of the camera based on the correspondence between the position of the index in the photographed image and the three-dimensional position of the index in the real space. As the known indices, a square marker, a circular marker, a point marker and the like are used, and these indices are, for example, artificially disposed in the real space. Incidentally, "Ryuhei Tenmoku, Akito Nishigami, Fumihisa Shibata, Asako Kimura and Hideyuki Tamura: Balancing design freedom and constraints in wall posters masquerading as AR tracking markers, Proc. Human-Computer Interaction International, 2009" (hereinafter, referred to as the document 1) discloses the technique of enabling to estimate the position and orientation of a camera by giving (disposing) a feature point marker having the feature capable of being detected easily from a photographed image of the camera as an index, in the environment of the real space.

In the technique disclosed in the document 1, the position and orientation of the camera can be estimated by giving, to the environment, the feature point marker having the feature easily detectable from the photographed image of the camera as the index. However, when the feature point marker is given to the environment, there arises a problem that the landscape of the real space is impaired by the given feature point marker.

SUMMARY OF THE INVENTION

In the present application, there is provided a technique for determining luminance of a pattern given as an index to an experience area of a real space, based on a threshold in case of detecting a feature of an image, and generating an image of the pattern of the determined luminance.

Further features of the present invention will become apparent from the following description of exemplary embodiments with reference to the attached drawings.

DESCRIPTION OF THE EMBODIMENTS

Hereinafter, preferred embodiments of the invention will be described in detail in accordance with the accompanying drawings.

In the following description, an example of providing, for a user, mixed reality (MR) and augmented reality (AR) of fusing in real time a real world and a virtual world of computer graphics (CG) together will be given. Here, the MR and the like can be applied to various fields such as assembly assistance for superimpose-displaying a working procedure and a wiring state at the time of assembling work, surgical support for superimpose-displaying the state of the inside of the body on the body surface of a patient, and the like. A portable information terminal such as a head-mounted type video see-through head-mounted display (HMD) or a tablet terminal having a video camera on the back side thereof is used as a device for providing the MR to the user. In the embodiments, the video see-through HMD is given as an example. An illustration of the video see-through HMD is omitted. An information processing system according to the embodiments is configured to comprise the video see-through HMD and a later-described information processing apparatus 1000 of the embodiments.

In the embodiments, when providing the MR to the user, the video see-through HMD estimates, based on an image photographed by a not-illustrated built-in camera, the position and orientation of the camera. The position and orientation of the camera can be measured by physical sensors of six degrees of freedom, such as a magnetic sensor, an ultrasonic sensor, an optical sensor and the like. However, in the embodiments, a method of estimating the position and orientation of the camera based on the photographed image is used. When the relevant method is used, it is easier and less expensive than using the physical sensor. More specifically, when estimating the position and orientation of the camera based on the photographed image, the HMD according to the embodiments detects feature points of the image such as a point, a line, an edge, a corner, a luminance gradient and the like as natural features from the photographed image of the real space, and estimates the position and orientation of the camera based on the detected natural features.

However, it is difficult to estimate the position and orientation of the camera if there are few natural features in the photographed image of the real space. Therefore, in the embodiments, a pattern which can be detected as a natural feature is generated, and an image of the relevant pattern is given as an index to the real space. In the embodiments, the pattern to be generated is referred to as an index pattern. As will be described in detail later, the index pattern of the embodiments is a pattern which is generated based on a threshold to be used for detecting the natural feature from the photographed image of the real space, and this pattern can be detected as the natural feature from the photographed image and is generated as a pattern which is difficult for the user to visually recognize. In the following description, the threshold which is used when detecting the natural feature from the photographed image is referred to as a feature detection threshold.

First Embodiment

Figure 1:
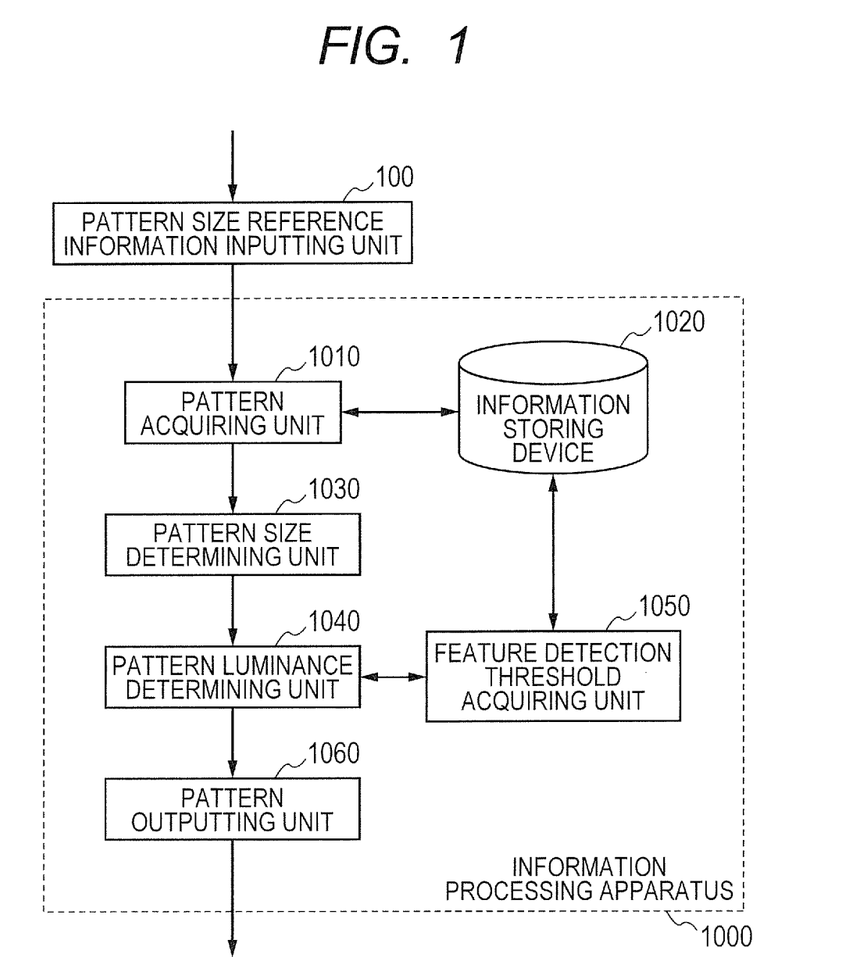
FIG. 1 is a diagram for illustrating a schematic constitution of an information processing apparatus according to a first embodiment.

FIG. 1 is a diagram for illustrating a schematic constitution of an information processing apparatus 1000 which generates an index pattern according to the first embodiment. The information processing apparatus 1000 comprises a pattern acquiring unit 1010, an information storing device 1020, a pattern size determining unit 1030, a pattern luminance determining unit 1040, a feature detection threshold acquiring unit 1050, and a pattern outputting unit 1060. A set of the pattern acquiring unit 1010 to the pattern outputting unit 1060 is an example of a determining unit and a generating unit in the present embodiment. A pattern size reference information inputting unit 100 may be a device which is connected to the information processing apparatus 1000 or may be included in the information processing apparatus 1000.

The pattern size reference information inputting unit 100 receives input information related to an experience area of the real space, and holds the information related to the experience area in a not-illustrated memory area. Here, the information related to the experience area may be input from, for example, an administrator of the information processing apparatus 1000 via a not-illustrated inputting device, or may be acquired by calculation or the like. In this case, although the administrator of the MR and the user of the MR are separated from each other, the administrator and the user may be the same person. The information related to the experience area held in the memory area of the pattern size reference information inputting unit 100 is transferred to the information processing apparatus 1000 as one of pattern size reference information to be used when generating the index pattern according to the present embodiment. In the present embodiment, the information related to the experience area includes, for example, information related to the shortest distance and the longest distance between various objects in the experience area and the camera of the HMD.

Incidentally, as an example, the object in the experience area includes not only a worktable and the body of a patient when the MR is applied for assembly support, surgical support and the like but also the wall, the ceiling, the floor and the like of a room. In addition, the information related to the experience area may include not only the shortest distance and the longest distance between the object in the experience area and the camera, but also information of, for example, the depth, the height, the width and the like of the experience area in the real space.

The pattern size reference information also includes information of the angle of view, the focal length, the optical characteristics of the lens of a camera which photographs the real space, the exposure at the time of photographing, the resolution of an image to be photographed, and the like. Incidentally, the information of the angle of view, the focal length, the optical characteristics of the camera, the exposure, the resolution and the like may be input by an administrator or the like, or may be calculated by the pattern size reference information inputting unit 100.

The pattern acquiring unit 1010 of the information processing apparatus 1000 acquires the pattern size reference information from the pattern size reference information inputting unit 100. Further, the pattern acquiring unit 1010 acquires from the information storing device 1020 the information of an original pattern which is the basis of the index pattern. Incidentally, the original pattern may be a predetermined pattern or a pattern generated each time a request is received from the pattern acquiring unit 1010. When the original pattern is generated each time the request is received from the pattern acquiring unit 1010, for example, the relevant original pattern is generated by a not-illustrated original pattern generating unit. The pattern size reference information and the original pattern information acquired by the pattern acquiring unit 1010 are transferred to the pattern size determining unit 1030.

The information storing device 1020 stores therein at least the information of the original pattern and the information of the feature detection threshold. The information storing device 1020 transfers the information of the original pattern to the pattern acquiring unit 1010 in response to the request from the pattern acquiring unit 1010, and transfers the information of the feature detection threshold to the feature detection threshold acquiring unit 1050 in response to a request from the feature detection threshold acquiring unit 1050. The feature detection threshold acquiring unit 1050 transfers the information of the feature detection threshold acquired from the information storing device 1020 to the later-described pattern luminance determining unit 1040.

The pattern size determining unit 1030 determines a pattern size Sα of the index pattern, based on the pattern size reference information and the information of the original pattern transferred from the pattern acquiring unit 1010.

Here, it is necessary to set the size of the index pattern so that the HMD can detect the relevant index pattern as the natural feature from the photographed image when the experience area to which the relevant index pattern has been given is photographed by the camera. The index pattern is given to the object in the experience area. Therefore, the size of the index pattern must be the size with which, when the index pattern is given to an object at any position within the range of the shortest distance and the longest distance between each object in the experience area and the camera, the HMD can detect the relevant index pattern as the natural feature from the photographed image. Further, since the index pattern is detected from the photographed image of the experience area, for example, when the camera cannot resolve the figure (or the design) of the index pattern and thus the figure of the index pattern in the photographed image is smashed (or crashed), it is impossible to detect the index pattern. Therefore, even if the index pattern is given to any position within the range of the shortest distance and the longest distance between the object in the experience area and the camera, it is necessary to determine the size of the index pattern to the size with which the camera can resolve a spatial frequency of the figure of the relevant index pattern. However, when the size of the index pattern is large more than necessary, there is a high possibility that, when the index pattern is given in the experience area, the relevant index pattern becomes easy to be visually recognized by the user of the MR or the like. Therefore, it is necessary to determine the size of the index pattern to a size which does not become large more than necessary. For such reasons as above, the pattern size determining unit 1030 calculates the pattern size Sα with which the natural feature of the index pattern can be detected from the photographed image and which is not large more than necessary, based on the information of the shortest distance and the longest distance, the information of the spatial frequency of the figure of the pattern, the information of the resolution of the camera, and the like.

Figure 2:
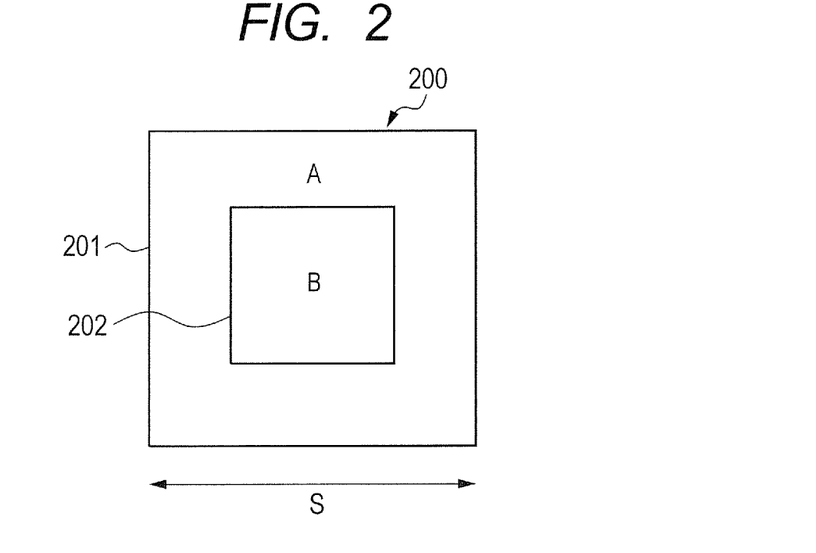
FIG. 2 is a diagram for illustrating an example of a pattern which is the origin of an index pattern.

FIG. 2 is a diagram for illustrating an example of an original pattern 200. The original pattern 200 in FIG. 2 is, for example, a pattern which has a square figure in which a B area 202 is disposed at the center and an A area 201 is disposed around the B area. Moreover, for example, the A area 201 is the area with a high density (low luminance), and the B area 202 is the area with a low density (low luminance). Here, it is assumed that a size S illustrated in FIG. 2 is a reference size (for example, the size of the original pattern) to be used when the pattern size Sα is calculated by the pattern size determining unit 1030. Hereinafter, a method of determining the pattern size Sα by the pattern size determining unit 1030 will be described using the example of the original pattern 200 illustrated in FIG. 2.

First of all, the longest distance Dmax between the object in the experience area and the camera is calculated based on the information of the depth, the height and the width of the experience area. Here, the longest distance Dmax may be calculated by the pattern size determining unit 1030 or may be input by the administrator of the information processing apparatus 1000 or the like. When the depth of the experience area is Z, the height thereof is Y, and the width thereof is X, the longest distance Dmax between the object in the experience area and the camera can be calculated by the expression (1). Here, it is assumed that, for example, the shortest distance Dmin is input by the administrator of the information processing apparatus 1000 or the like.

$$D\max=\sqrt{(Z^2+Y^2+X^2)} \quad (1)$$

Besides, for example, when the length of the short side of the imaging element of the camera is L and the spatial frequency of the figure of the original pattern 200 is F, the reference size S is given by the expression (2). Incidentally, since the resolution of the camera is acquired by a ratio of the length of the side of the imaging element to the number of pixels, the short side length L of the imaging element of the camera is used here as a value simply representing the resolution of the camera.

$$S=L/(2\times F) \quad (2)$$

Then, the pattern size determining unit 1030 calculates the pattern sizes Sα respectively from the expressions (3) and (4). Here, the expression (3) is the expression for acquiring the pattern size Sα according to the shortest distance Dmin between the object in the experience area and the camera, and the expression (4) is the expression for acquiring the pattern size Sα based on the longest distance Dmax between the object in the experience area and the camera.

$$S\alpha=S\times D\min \quad (3)$$

$$S\alpha=S\times D\max \quad (4)$$

In this manner, the pattern size determining unit 1030 acquires a set of the pattern sizes Sα respectively according to the shortest distance Dmin and the longest distance Dmax between the object in the experience area and the camera. Then, the pattern size determining unit 1030 transfers the information of a set of the index patterns for which the pattern sizes Sα corresponding to the shortest distance Dmin and the longest distance Dmax have been determined respectively, to the pattern luminance determining unit 1040 together with the pattern size reference information.

The pattern luminance determining unit 1040 receives the information of the set of the index patterns for which the pattern sizes have been determined respectively by the pattern size determining unit 1030 and the pattern size reference information, and also receives the information of the feature detection threshold from the feature detection threshold acquiring unit 1050. Then, the pattern luminance determining unit 1040 determines the luminance of each index pattern based on the pattern size reference information and the feature detection threshold. More specifically, the pattern luminance determining unit 1040 determines the luminance of the index pattern so as to exceed the feature detection threshold. However, if the luminance is simply determined so as to exceed the feature detection threshold, there is a case where the luminance of the index pattern in the photographed image falls below the feature detection threshold due to the characteristics of the imaging element of the camera and the optical characteristics of the lens. Therefore, the pattern luminance determining unit 1040 determines, in consideration of how is the luminance of the index pattern in the photographed image, the luminance of the index pattern based on the pattern size reference information (the information of the characteristics of the imaging element of the camera, the optical characteristics of the lens and the like).

Figure 3:
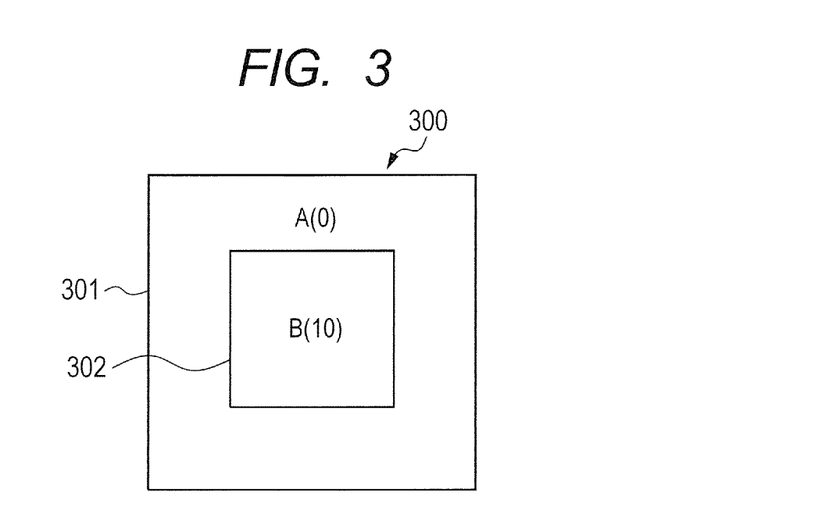
FIG. 3 is a diagram to be used for describing a combination example of luminance differences of the index pattern.

FIG. 3 is a diagram for illustrating an example of an index pattern 300 which is acquired after determining the luminance to the original pattern 200 of FIG. 2. In the index pattern 300 of FIG. 3, it is assumed that, for example, when the feature detection threshold is the value of the luminance "10", the luminance value of an A area 301 is "0" and the luminance value of a B area 302 is "10". The A area 301 is the black area because the luminance value thereof is "0", and the B area 302 is the high-density gray area because the luminance value thereof is "10". Hereinafter, a method of determining the pattern luminance by the pattern luminance determining unit 1040 will be described using the example of the index pattern 300 illustrated in FIG. 3.

Here, in order for the HMD to be able to detect the index pattern in the photographed image as the natural feature, the index pattern must maintain a luminance condition capable of being detected as the natural feature. As an example, a case where the natural feature is detected based on a luminance gradient of the photographed image is given. Incidentally, as the method of detecting the natural feature based on the luminance gradient, it is possible to use a known method described by, for example, "D. Lowe, Distinctive image features from scale-invariant keypoints, International Journal of Computer Vision (IJCV), 2004", or "Bay, Herbert, Tinne Tuytelaars, and Luc Van Gool. Surf: Speeded up robust features, European Conference on Computer Vision (ECCV), 2006". When detecting the natural feature based on the luminance gradient, the luminance of the A area 301 and the luminance of the B area 302 of the index pattern 300 in FIG. 3 must be a combination of luminance by which a luminance difference equal to or higher than the feature detection threshold arises. However, if the luminance difference is larger than necessary, there is a high possibility that, when the index pattern is given in the experience area, the relevant index pattern becomes easy to be visually recognized by the user of the MR or the like. Therefore, it is necessary to determine the luminance of the A area 301 and the luminance of the B area 302 of the index pattern 300 to be a combination of luminance by which the luminance difference equal to or higher than the feature detection threshold arises and the relevant luminance difference does not become large more than necessary. In the example of FIG. 3, the feature detection threshold is determined to be "10", the luminance value of the A area 301 is determined to be "0", and the luminance value of the B area 302 is determined to be "10", on the basis of such luminance determination conditions as described above.

Incidentally, the luminance is given as the example here. However, for example, in a case where the luminance does not affect the detection of the natural feature, when the figure of the original pattern is being maintained, there is no limitation on the combination of the luminance of the A area and the luminance of the B area. Besides, in the above example, only the "luminance" of the index pattern is described. However, if the luminance is expressed by a color space such as an RGB color space, a YUV color space or the like, the luminance may be luminance in any color space. Besides, as an algorithm for detecting the natural feature, it may be possible to use an algorithm for defining a condition of another natural feature and thus detecting the natural feature if it satisfies the condition of the natural feature.

As described above, the pattern size Sα is determined by the pattern size determining unit 1030, and the information of the set of the index patterns for which the luminance of each pattern has been determined by the pattern luminance determining unit 1040 is transferred to the pattern outputting unit 1060. Then, the pattern outputting unit 1060 generates and outputs an image of the index pattern according to the received information of the set of the index patterns. The image output of the index pattern may be performed by any of printing on a paper medium, projection with light, or the like. In the present embodiment, the index pattern is given to the experience area in the real space, by disposing the paper medium on which the image of the index pattern has been printed in the experience area or by projecting the projection light of the image of the index pattern in the experience area.

Figure 4:
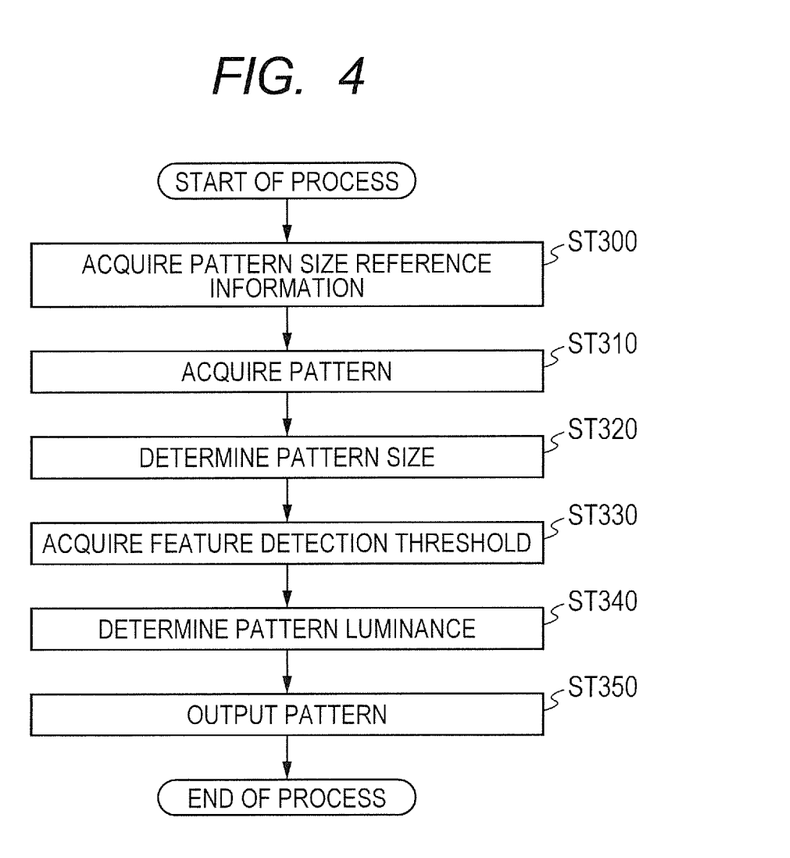
FIG. 4 is a flow chart of a process to be performed by the information processing apparatus according to the first embodiment.

FIG. 4 is a flow chart for describing a process flow from the acquisition of the pattern size reference information to the generation and the output of the index pattern image by the pattern size reference information inputting unit 100 and the information processing apparatus 1000 illustrated in FIG. 1. In the following description, steps ST300 to ST350 in the flow chart are abbreviated as ST300 to ST350 respectively, and such a way is applied also to other flow charts to be described later. For example, the process in the flow chart of FIG. 4 is started when the administrator or the like of the information processing apparatus 1000 instructs the information processing apparatus 1000 to generate the index pattern.

In the flow chart of FIG. 4, in ST300, the pattern size reference information inputting unit 100 acquires the pattern size reference information including the information related to the above experience area. After ST300, the information processing apparatus 1000 performs the process in ST310 and the following steps. The process of ST310 is the process which is performed by the pattern acquiring unit 1010 of the information processing apparatus 1000.

In ST310, the pattern acquiring unit 1010 receives the pattern size reference information from the pattern size reference information inputting unit 100, and also receives the information of the original pattern from the information storing device 1020. Then, the pattern acquiring unit 1010 transfers the acquired information to the pattern size determining unit 1030. After S310, the information processing apparatus 1000 advances the process to ST320 performed by the pattern size determining unit 1030.

In ST320, the pattern size determining unit 1030 calculates the pattern size Sα as described above, based on the pattern size reference information and the information of the original pattern. Then, the pattern size determining unit 1030 transfers the information of the index pattern determined to the pattern size Sα, the pattern size reference information and the like to the pattern luminance determining unit 1040. After S320, the information processing apparatus 1000 advances the process to ST330 performed by the feature detection threshold acquiring unit 1050.

In ST330, the feature detection threshold acquiring unit 1050 acquires the information of the feature detection threshold from the information storing device 1020, and transfers the acquired information of the feature detection threshold to the pattern luminance determining unit 1040. After ST330, the information processing apparatus 1000 advances the process to ST340 performed by the pattern luminance determining unit 1040.

In ST340, the pattern luminance determining unit 1040 determines the luminance of the index pattern based on the feature detection threshold as described above. Then, the pattern luminance determining unit 1040 transfers the information of the index pattern for which the luminance has been determined, to the pattern outputting unit 1060. After ST340, the information processing apparatus 1000 advances the process to ST350 performed by the pattern outputting unit 1060.

In ST350, the pattern outputting unit 1060 generates and outputs the image of the index pattern for which the pattern size and the luminance have been determined, as described above. After ST350, the information processing apparatus 1000 ends the process of the flow chart of FIG. 4.

Incidentally, the order of the process in ST300 and the process in ST310 may be changed. Moreover, the order of the processes from ST320 to ST340 may be changed as appropriate, or the relevant processes may be performed in parallel.

As described above, the index pattern of the present embodiment is the pattern having the size determined based on the pattern size reference information including the information related to the experience area of the real space, and is the pattern having the luminance generated based on the feature detection threshold at the time of detecting the natural feature. Therefore, the index pattern of the present embodiment is the pattern which can be detected as the natural feature from the photographed image of the experience area in the real space and is difficult for the user to visually recognize. Moreover, since the index pattern given to the experience area is the pattern which is difficult not only for the user of the HMD but also for a third person not using the HMD to visually recognize, the landscape in the real space may is not impaired.

Modification 1 of First Embodiment

Figure 5:
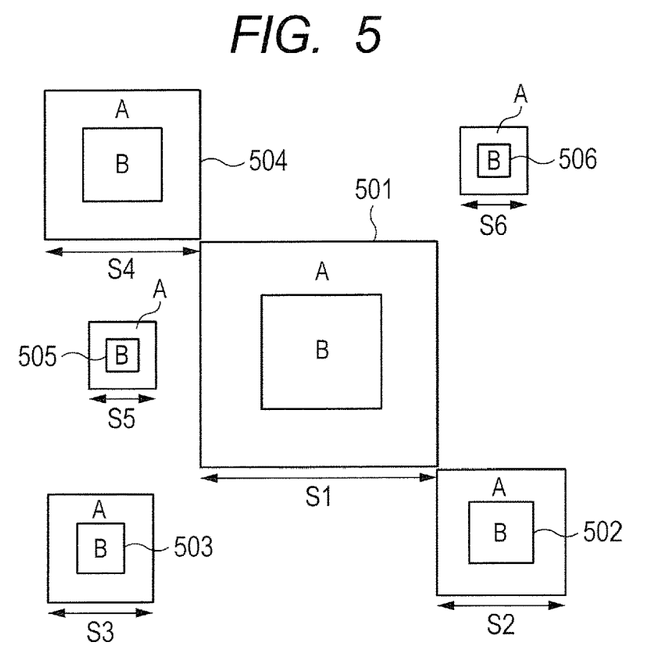
FIG. 5 is a diagram for describing examples of sizes of a plurality of index patterns.

In the first embodiment, the example in which the index pattern of the set of the pattern sizes Sα based on the shortest distance and the longest distance is generated has been described. However, for example, a pattern gathering which includes a plurality of index patterns 501 to 506 respectively corresponding to sizes S1 to S6 as illustrated in FIG. 5 may be generated. When the gathering of the index patterns 501 to 506 as illustrated in FIG. 5 is used, the pattern sizes S1 to S6 may be determined for each of the index patterns. The pattern sizes S1 to S6 of the respective index patterns are determined as the sizes which fall within the range of the appropriate pattern size Sα based on the shortest distance and the longest distance, the angle of view and the resolution of the camera, and the like.

Incidentally, the sizes of the plurality of index patterns are not limited to the example of FIG. 5. Namely, another size may be set if it is within the range of the appropriate pattern size Sα based on the experience area and the information of the external device such as the camera. Also, in the example of FIG. 5, as well as the above case in the first embodiment, the index pattern is the pattern which can be detected as the natural feature from the photographed image of the experience area in the real space and is difficult for the user to visually recognize.

Modification 2 of First Embodiment

Figure 6:
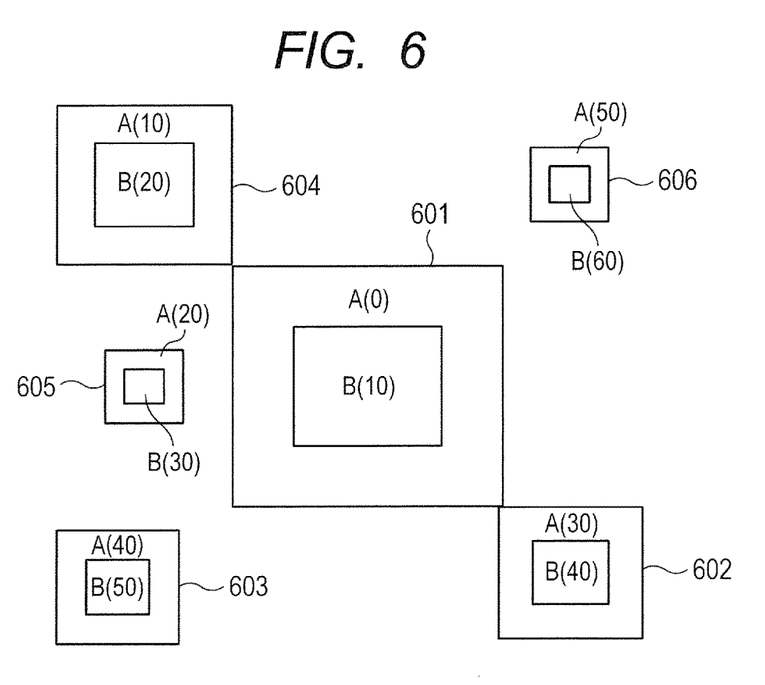
FIG. 6 is a diagram for describing a combination example of the plurality of index patterns.

In the first embodiment, the luminance is determined with respect to the set of the index patterns. However, if the above luminance determination conditions are satisfied, for example, the set of the index patterns may be generated as a pattern gathering which includes index patterns 601 to 606 of a plurality of kinds of luminance as illustrated in FIG. 6. Incidentally, FIG. 6 illustrates an example in which the luminance is determined for each of the plurality of index patterns of the plurality of sizes described in FIG. 5. In the example of FIG. 6, the index pattern 601 has the luminance of "0" in the area A and the luminance of "10" in the area B, the index pattern 602 has the luminance of "30" in the area A and the luminance of "40" in the area B, and the index pattern 603 has the luminance of "40" in the A area and the luminance of "50" in the area B. Moreover, the index pattern 604 has the luminance of "10" in the area A and the luminance of "20" in the area B, the index pattern 605 has the luminance of "20" in the area A and the luminance of "30" in the area B, and the index pattern 606 has the luminance "50" in the area A and the luminance of "60" in the area B. Also, in the example of FIG. 6, as well as the above case, the index pattern is the pattern which can be detected as the natural feature from the photographed image of the experience area in the real space and is difficult for the user to visually recognize.

Modification 3 of First Embodiment

In the first embodiment, the index pattern luminance is determined based on the pattern size reference information and the feature detection threshold. However, the luminance of the index pattern may be determined in consideration of luminance of the experience area (e.g., real wall and floor) to which the pattern is given. More specifically, first, the luminance of the wall is acquired from the photographed image of the wall to which the pattern is to be given. The area for which the luminance is acquired is the area surrounding the area to which the pattern is to be given, and the average value of the luminance in the relevant area may be used as the luminance of the wall. When the acquired luminance of the wall is "50", the luminance of the pattern to be disposed is set to, for example, "60". Although the luminance of the pattern may be manually set by the user as described above, for example, the luminance of the pattern may be automatically set according to the parameter of the filter to be detected. In that case, it only has to set the difference between the luminance of the pattern and the luminance of the wall to be an extent which can be detected by the detection filter. As just described, also by considering the luminance of the actual wall and floor where the pattern is disposed, it becomes difficult for the user to visually recognize the pattern.

Second Embodiment

In the second embodiment, an example of generating an index pattern which is more difficult for a user or the like to visually recognize by considering a luminance difference (divergence) between an inputting device (imaging device) such as an HMD camera and an outputting device such as a printing device of a pattern outputting unit 1060 will be described. In the following, only parts different from the constitution and the like of the above first embodiment will be described.

Figure 7:
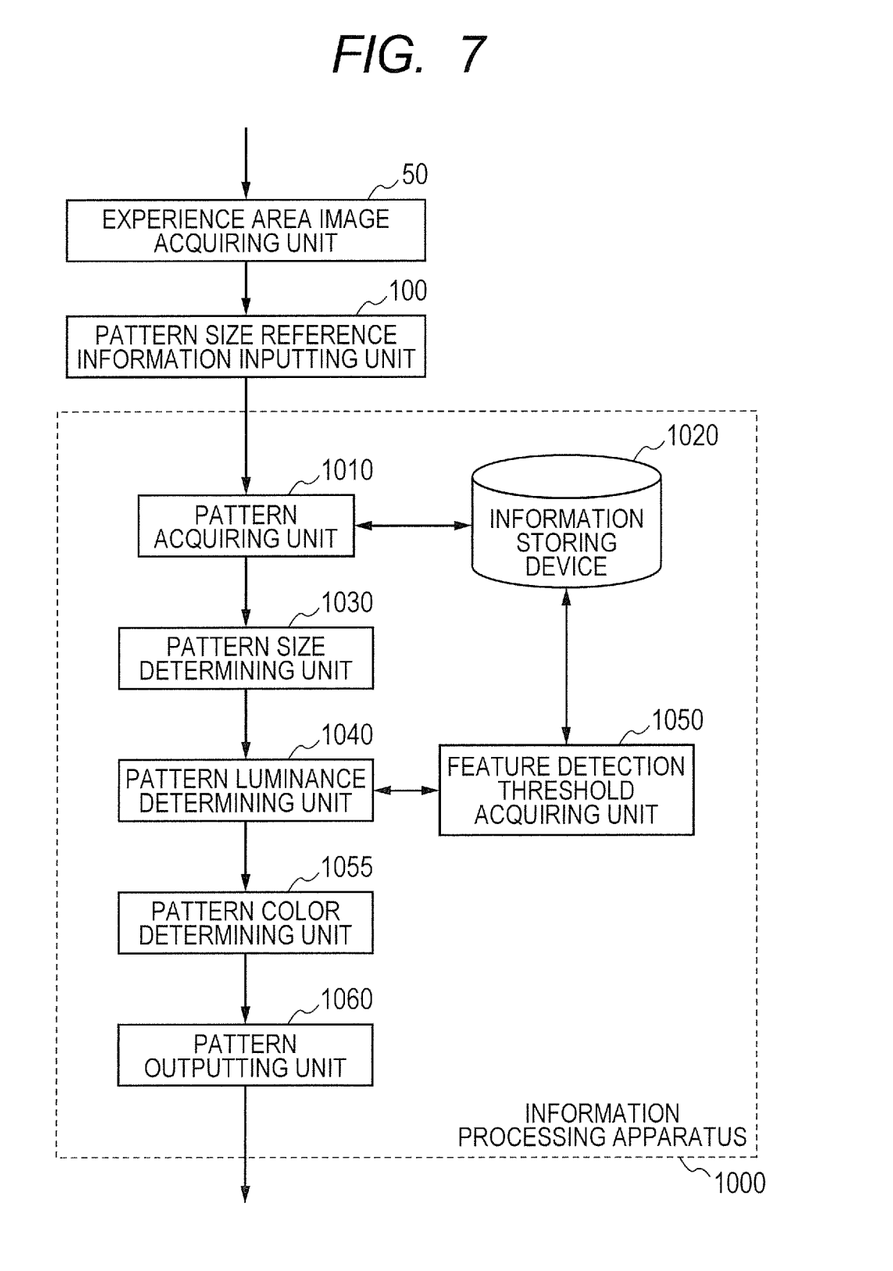
FIG. 7 is a diagram for illustrating a schematic constitution of an information processing apparatus according to a second embodiment.

FIG. 7 is a diagram for illustrating a schematic constitution of an information processing apparatus 1000 which generates an index pattern according to the second embodiment. The information processing apparatus 1000 comprises a pattern color determining unit 1055 in addition to the constitution of the information processing apparatus 1000 according to the above first embodiment. Moreover, in the constitution of the second embodiment, an experience area image acquiring unit 50 is added.

In the second embodiment, the experience area image acquiring unit 50 acquires information related to an experience area image in which an experience area to which an index pattern is to be added later has been photographed by an imaging device, and transfers the acquired information of the experience area image to a pattern size reference information inputting unit 100. In the present embodiment, the imaging device which acquires the experience area image is an HMD camera.

The pattern size reference information inputting unit 100 transfers the information of the experience area image acquired by the experience area image acquiring unit to the information processing apparatus 1000 together with the pattern size reference information described in the first embodiment. Since a pattern acquiring unit 1010 and a pattern size determining unit 1030 are similar to those described in the first embodiment, the description thereof will be omitted.

In the second embodiment, an information storing device 1020 stores, in addition to the original pattern information and the feature detection threshold described above, a luminance value correction parameter to be used when correcting the luminance difference between the inputting and outputting devices. A feature detection threshold acquiring unit 1050 acquires the information of the feature detection threshold and the information of the luminance value correction parameter, and transfers the acquired information to the pattern luminance determining unit 1040.

In the second embodiment, a pattern luminance determining unit 1040 receives, from the pattern size determining unit 1030, the information of the index pattern for which the pattern size Sα has been determined as described above, and the pattern size reference information including the experience area image. Also, the pattern luminance determining unit 1040 receives, from the feature detection threshold acquiring unit 1050, the above feature detection threshold and the luminance value correction parameter used when correcting the luminance difference between the inputting and outputting devices.

The pattern luminance determining unit 1040 in the second embodiment determines the luminance of the index pattern based on the received information. More specifically, the pattern luminance determining unit 1040 first calculates the luminance of the index pattern in the same manner as described in the first embodiment. Then, in the second embodiment, the pattern luminance determining unit 1040 further corrects the luminance of the index pattern by the luminance value correction parameter according to the experience area image, and determines the corrected luminance as the luminance of the index pattern.

Here, the index pattern is output from the pattern outputting unit 1060 including an outputting device such as a printing device, a projecting device or the like, the output index pattern is given to the experience area, and the given index pattern is photographed by the HMD camera being the inputting device. Therefore, since the luminance of the index pattern output from the pattern outputting unit 1060 and the luminance of the index pattern in the image photographed by the HMD camera are values which depend on the device characteristics of the inputting and outputting devices, there is a possibility that the luminance difference therebetween has arisen due to the device characteristics of the inputting and outputting devices. For this reason, in the second embodiment, to correct the luminance difference between the index patterns by the inputting and outputting devices, the pattern luminance determining unit 1040 corrects the luminance of the index pattern acquired in the same manner as that in the first embodiment, based on the luminance value correction parameter according to experience area image.

Here, it may be possible to use the luminance value correction parameter which is generated in advance or the luminance value correction parameter which is generated each time the MR is provided. For example, the luminance value correction parameter can be generated as a parameter according to a luminance difference between an image acquired by giving a confirmation pattern of which the luminance value has been determined to a predetermined value to the experience area and photographing the relevant confirmation pattern, and a predetermined luminance value of the confirmation pattern. Therefore, when the index pattern having the luminance value corrected based on the luminance value correction parameter corresponding to the experience area image is given to the experience area, the luminance difference between the luminance of the experience area and the luminance of the index pattern is minimized, so that the index pattern becomes the pattern which is difficult for the user or the like to visually recognize. Then, the information of the index pattern of which the luminance has been determined as described above is transferred to the pattern color determining unit 1055 together with the information of the experience area image.

Figure 8:
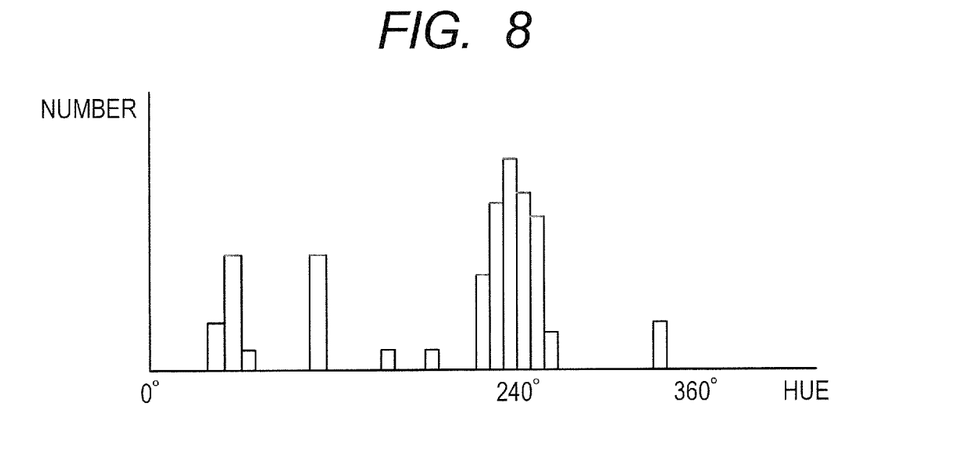
FIG. 8 is a diagram for describing a method of determining a color of the pattern.

The pattern color determining unit 1055 determines the color of the index pattern based on the luminance of the index pattern received from the pattern luminance determining unit 1040 and the information of the experience area image acquired by the experience area image acquiring unit 50. For example, as illustrated in FIG. 8, a hue is calculated for each pixel from the RGB components of the experience area image to generate a histogram, and the hue with the highest frequency in the histograms is determined as the main hue of the experience area image. Then, the pattern color determining unit 1055 determines a color acquired by combining the determined hue with the luminance of the index pattern, as the color of the index pattern. Thus, when the index pattern is given to the experience area, the index pattern becomes the pattern which is difficult for the user or the like to visually recognize. Incidentally, the hue may be determined not only by using a single experiential area image but also by using a plurality of experiential area images photographed in time series. In the present embodiment, as the example, the hue is acquired from the RGB components. However, the hue may be acquired by another method such as a Lab (Lab color space) color space here.

Figure 9:
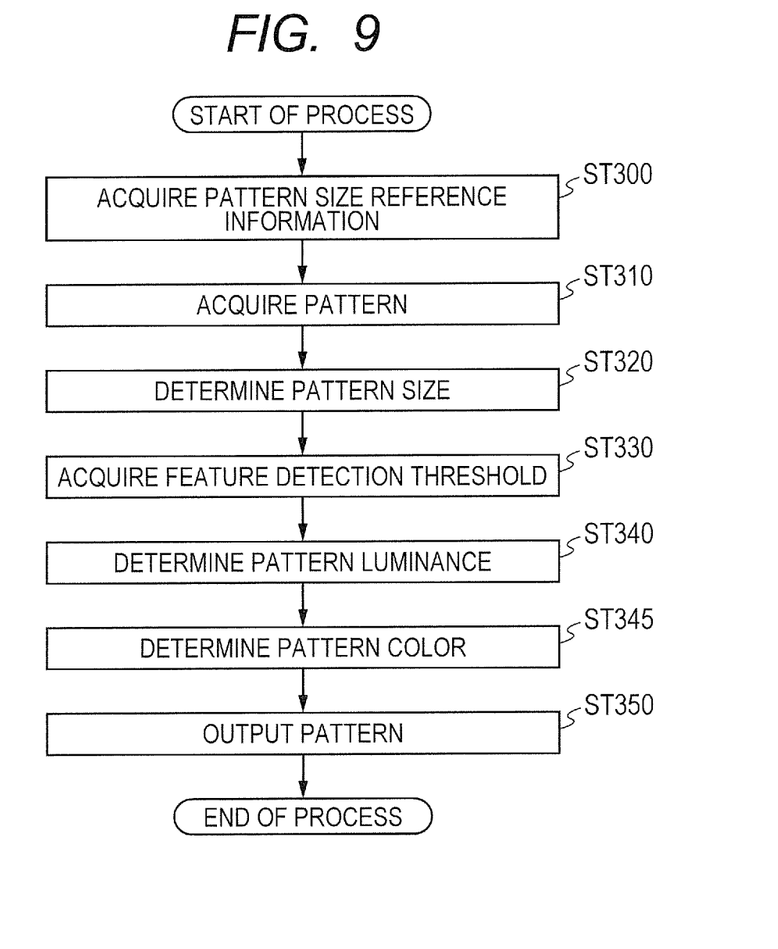
FIG. 9 is a flow chart of a process to be performed by the information processing apparatus according to the second embodiment.

FIG. 9 is a flow chart for describing a process flow from the acquisition of the pattern size reference information to the generation and the output of the index pattern by the pattern size reference information inputting unit 100 and the information processing apparatus 1000 in FIG. 7, according to the second embodiment. For example, the process in the flow chart of FIG. 9 is started when the administrator or the like of the information processing apparatus 1000 instructs the information processing apparatus 1000 to generate the index pattern. Here, only portions different from the flow chart of FIG. 4 in the first embodiment will be described.

In the flow chart of FIG. 9, in ST300, the pattern size reference information inputting unit 100 acquires the pattern size reference information including the information of the experience area image. In ST330, the feature detection threshold acquiring unit 1050 acquires the feature detection threshold and the above luminance value correction parameter. In ST340, the pattern luminance determining unit 1040 determines the luminance of the index pattern based on the above feature detection threshold and the above luminance value correction parameter. After ST340, the information processing apparatus 1000 advances the process to ST345 performed by the pattern color determining unit 1055. In ST345, the pattern color determining unit 1055 determines the color of the index pattern based on the luminance of the index pattern and the experience area image. After ST345, the information processing apparatus 1000 advances the process to ST350 performed by the pattern outputting unit 1060. After ST350, the information processing apparatus 1000 ends the process in the flow chart of FIG. 9.

Incidentally, the order of the process in ST300 and the process in ST310 may be changed. Moreover, the order of the processes from ST320 to ST345 may be changed as appropriate, or the relevant processes may be performed in parallel.

As described above, according to the second embodiment, the luminance value is corrected based on the luminance value correction parameter in which the luminance difference between the inputting device and the outputting device has been considered, and the index pattern of the color based on the corrected luminance value and the hue of the experience area image can be generated. The index pattern in the second embodiment can be detected as a natural feature from the photographed image of the experience area in the real space, and the natural feature can be detected not only in the figure of the index pattern but also at the boundary between the index pattern and the experience area. Besides, since the index pattern in the second embodiment is the pattern which is difficult for the user or other third party to visually recognize, the landscape in the real space is not impaired.

Modification 1 of the Second Embodiment

In the second embodiment, the pattern color determining unit 1055 determines the main hue of the experience area image by using the hue histogram. However, the method of determining the main hue of the experience area image is not limited to the above example. For example, it may be possible to perform area division of the experience area image based on the hues and determine the hue of the largest area as the main hue of the experience area image.

<Realization Example by Computer>

It should be noted that the respective parts of FIG. 1 in the first embodiment and FIG. 7 in the second embodiment can be realized by either a hardware constitution or a software configuration. For example, it may be possible to cause the CPU of a computer to execute the information processing program related to the process of the flow chart in the first or second embodiment.

Figure 10:
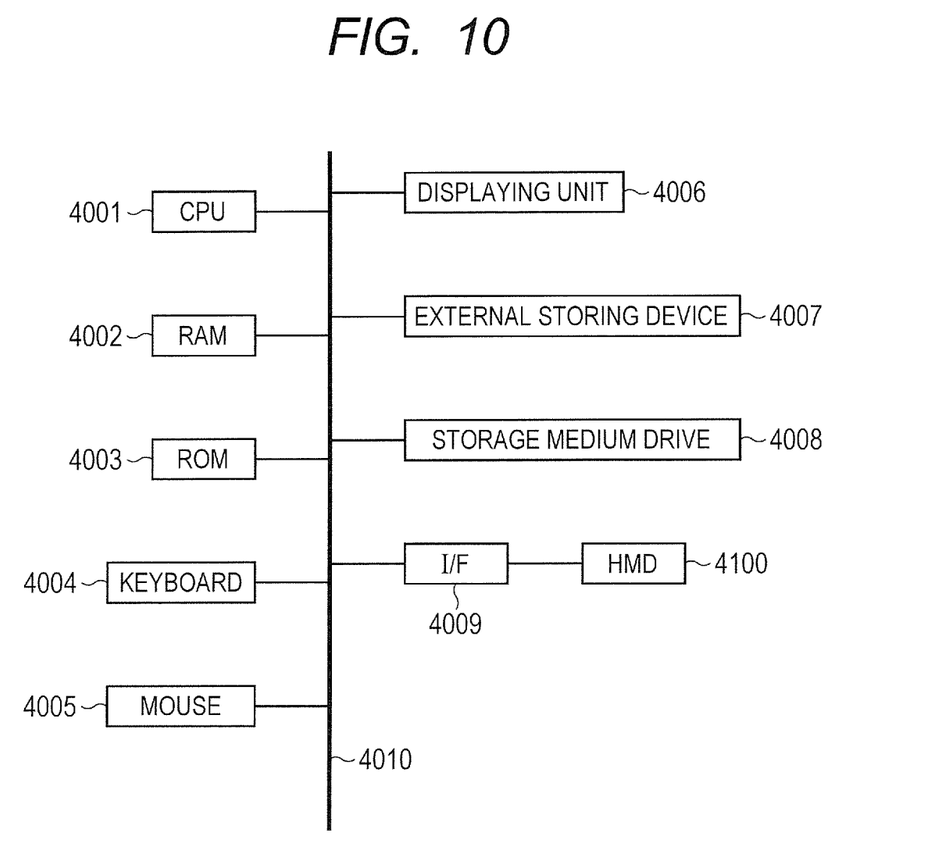
FIG. 10 is a diagram for illustrating a constitution example in which the second embodiment is achieved by a computer.

FIG. 10 is a diagram for illustrating a constitution example of a computer including a CPU capable of executing the information processing program of the present embodiment. In FIG. 10, a CPU 4001 controls the entire computer by using the programs and the data stored in a RAM 4002 and a ROM 4003, and further executes the information processing program according to the process in the first or second embodiment. Incidentally, it should be noted that the computer illustrated in FIG. 10 is capable of not only executing the information processing program according to the process in the first or second embodiment but also performing a process of providing the MR to the user. Therefore, FIG. 10 shows the example in which also an HMD 4100 is connected to the computer.

The RAM 4002 has an area for temporarily storing various programs, data and the like including the information processing program of the present embodiment loaded from an external storing device 4007 and/or a storage medium drive 4008. Further, the RAM 4002 also has an area for temporarily storing data received from an external device via an I/F (interface) 4009. In this example, the external device is a printing device or a projecting device which prints the image of the index pattern generated as above, a camera which acquires the above experience area image, or the like. Further, the RAM 4002 also has a work area to be used when the CPU 4001 performs each process. That is, the RAM 4002 can appropriately provide various areas. The ROM 4003 stores therein computer setting data, a boot program and the like.

A keyboard 4004 and a mouse 4005 are an example of an operation inputting device. Namely, the user of the computer can input various instructions to the CPU 4001 by using the keyboard and the mouse. Among the above pattern size reference information, the information which can be input by the user is actually input by the user via the keyboard 4004 and/or the mouse 4005. A displaying unit 4006, which is configured by a display, can display the process result of the CPU 4001 with images, characters and the like.

The external storing device 4007 is a large-capacity information storing device which is typified by a hard disk drive device. In the external storing device 4007, the information processing program and/or the data for causing the CPU 4001 to execute the processes according to the above embodiment described as being performed by an OS (operating system) and/or the information processing apparatus are stored. The information processing program according to the present embodiment includes the program for executing each process of the flow chart in the above first or second embodiment. In addition, the data stored in the external storing device 4007 includes the information of the original pattern and the information of the feature detection threshold stored in the above information storing device 1020, the data of the luminance value correction parameter, and other various data.

The programs and the data stored in the external storing device 4007 are loaded to the RAM 4002 as appropriate under the control of the CPU 4001. The CPU 4001 performs the processes described in the first or second embodiment by using the loaded program and the loaded data, so that the information processing apparatus 1000 performs the various processes.

The storage medium drive 4008 reads out the programs and the data recorded on a storage medium such as a CD-ROM (compact disk read only memory), a DVD-ROM (digital versatile disk read only memory) or the like, and writes the programs and the data to the storage media. It should be noted that some or all of the programs and the data described as being stored in the external storing device 4007 may be recorded in the relevant storage medium. The programs and the data read from the storage medium by the storage medium drive 4008 are output to the external storing device 4007 and/or the RAM 4002.

The I/F 4009 is constituted by an analog video port and a digital input/output port such as an IEEE (Institute of Electrical and Electronics Engineers) 1394 port to be used for connecting the above external device such as the camera or the like, a DVI (digital visual interface) port to be used for outputting the image (data) of the index pattern to the above printing apparatus and the above projecting device, and the like. Incidentally, the data received via the I/F 4009 can also be input to the RAM 4002 or the external storing device 4007. It should be noted that the pattern size reference information may be acquired via the I/F 4009. Further, when the computer illustrated in FIG. 10 provides the MR to the user, the HMD 4100 is connected to the I/F 4009. A bus 4010 is a bus which is used to connect the above units mutually.

The above embodiments are merely the examples of embodying the present invention, and the technical scope of the present invention should not be interpreted restrictively by the above embodiments. That is, the present invention can be carried out in various forms without departing from the technical idea or the main features thereof.

According to the present application, it is possible to generate the indices which do not impair the landscape of the real space.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-047233, filed Mar. 10, 2016 and Japanese Patent Application No. 2017-001010, filed Jan. 6, 2017 which are hereby incorporated by reference herein in their entirety.

What is claimed is:

1. An information processing apparatus comprising:
one or more processors; and
a memory coupled to the one or more processors, the memory having stored thereon instructions which, when executed by the one or more processors, cause the information processing apparatus to:
acquire, based on an image acquired by photographing an experience area of a real space, luminance and a color of the experience area in the image;
determine luminance of a pattern given as an index to the experience area of the real space, based on a predetermined threshold of a luminance difference previously set for detecting a feature of the index and luminance of an object which is in the image and pattern size information of the index based on resolution information of a camera capturing the index; and
generate an image of the pattern of the determined luminance and the determined pattern size information.

2. The information processing apparatus according to claim 1, wherein the memory stores further instructions, which when executed by the one or more processors, cause the information processing apparatus to acquire a main hue of the photographed image from a hue histogram of the photographed image, and determine color of the pattern based on the main hue and the luminance of the object.

3. The information processing apparatus according to claim 2, wherein the memory stores further instructions, which when executed by the one or more processors, cause the information processing apparatus to acquire the main hue from a plurality of experience area images acquired by photographing the real space, and determine the color of the pattern based on the main hue and the luminance of the object.

4. The information processing apparatus according to claim 1, wherein the memory stores further instructions, which when executed by the one or more processors, cause the information processing apparatus to divide the photographed image into areas of respective hues according to the hues of the photographed image, acquire a main hue of the photographed image based on a size of a divided area, and determine the color of the pattern based on the main hue and the luminance of the object.

5. The information processing apparatus according to claim 4, wherein the memory stores further instructions, which when executed by the one or more processors, cause the information processing apparatus to set the hue of a largest area among the divided areas, to the main hue of the photographed image.

6. The information processing apparatus according to claim 1, wherein the memory stores further instructions, which when executed by the one or more processors, cause the information processing apparatus to determine a first size of the pattern based on a shortest distance between the experience area of the real space and the camera of photographing the real space and a second size of the pattern based on a longest distance between the experience area of the real space and the camera of photographing the real space.

7. The information processing apparatus according to claim 6, wherein the memory stores further instructions, which when executed by the one or more processors, cause the information processing apparatus to determine the size of the pattern further based on an angle of view and a resolution of the camera.

8. The information processing apparatus according to claim 1, wherein the memory stores further instructions, which when executed by the one or more processors, cause the information processing apparatus to:
correct the luminance determined based on the predetermined threshold, by using a correction parameter, and
generate the image of the pattern of the corrected luminance.

9. The information processing apparatus according to claim 1, wherein the pattern disposed in the experience area of the real space is used as the index in case of determining a position and orientation of an imaging device for photographing the real space.

10. An information processing method which is performed by an information processing apparatus of generating an image of a pattern to be given to an experience area of a real space, the method comprising:
acquiring, based on an image acquired by photographing an experience area of a real space, luminance and a color of the experience area in the image;

determining luminance of the pattern to be given as an index to the experience area of the real space, based on a predetermined threshold of a luminance difference previously set for detecting a feature of the index and luminance of an object which is in the image and pattern size information of the index based on resolution information of a camera capturing the index; and generating an image of the pattern of the determined luminance and the determined pattern size information.

11. A non-transitory computer-readable storage medium which stores a program to cause an information processing apparatus to implement an information processing method comprising:

acquiring, based on an image acquired by photographing an experience area of a real space, luminance and a color of the experience area in the image;

determining luminance of a pattern to be given as an index to the experience area of the real space, based on a predetermined threshold of a luminance difference previously set for detecting a feature of the index and luminance of an object which is in the image and pattern size information of the index based on resolution information of a camera capturing the index; and generating an image of the pattern of the determined luminance and the determined pattern size information.

* * * * *